Nov. 10, 1964 S. L. MERKEL 3,156,877

DIRECT CURRENT TO ALTERNATING CURRENT CONVERTER

Original Filed April 25, 1958

2 Sheets-Sheet 1

INVENTOR.
STEPHEN L. MERKEL
BY John Howard Smith

Nov. 10, 1964 S. L. MERKEL 3,156,877

DIRECT CURRENT TO ALTERNATING CURRENT CONVERTER

Original Filed April 25, 1958 2 Sheets-Sheet 2

INVENTOR.
STEPHEN L. MERKEL
BY John Howard Smith

United States Patent Office 3,156,877
Patented Nov. 10, 1964

3,156,877
DIRECT CURRENT TO ALTERNATING CURRENT CONVERTER

Stephen L. Merkel, Cleveland, Ohio, assignor to Lorain Products Corporation, a corporation of Ohio
Original application Apr. 25, 1958, Ser. No. 730,962, now Patent No. 3,065,429, dated Nov. 20, 1962. Divided and this application Aug. 28, 1962, Ser. No. 219,897
4 Claims. (Cl. 331—113)

Figure 1:
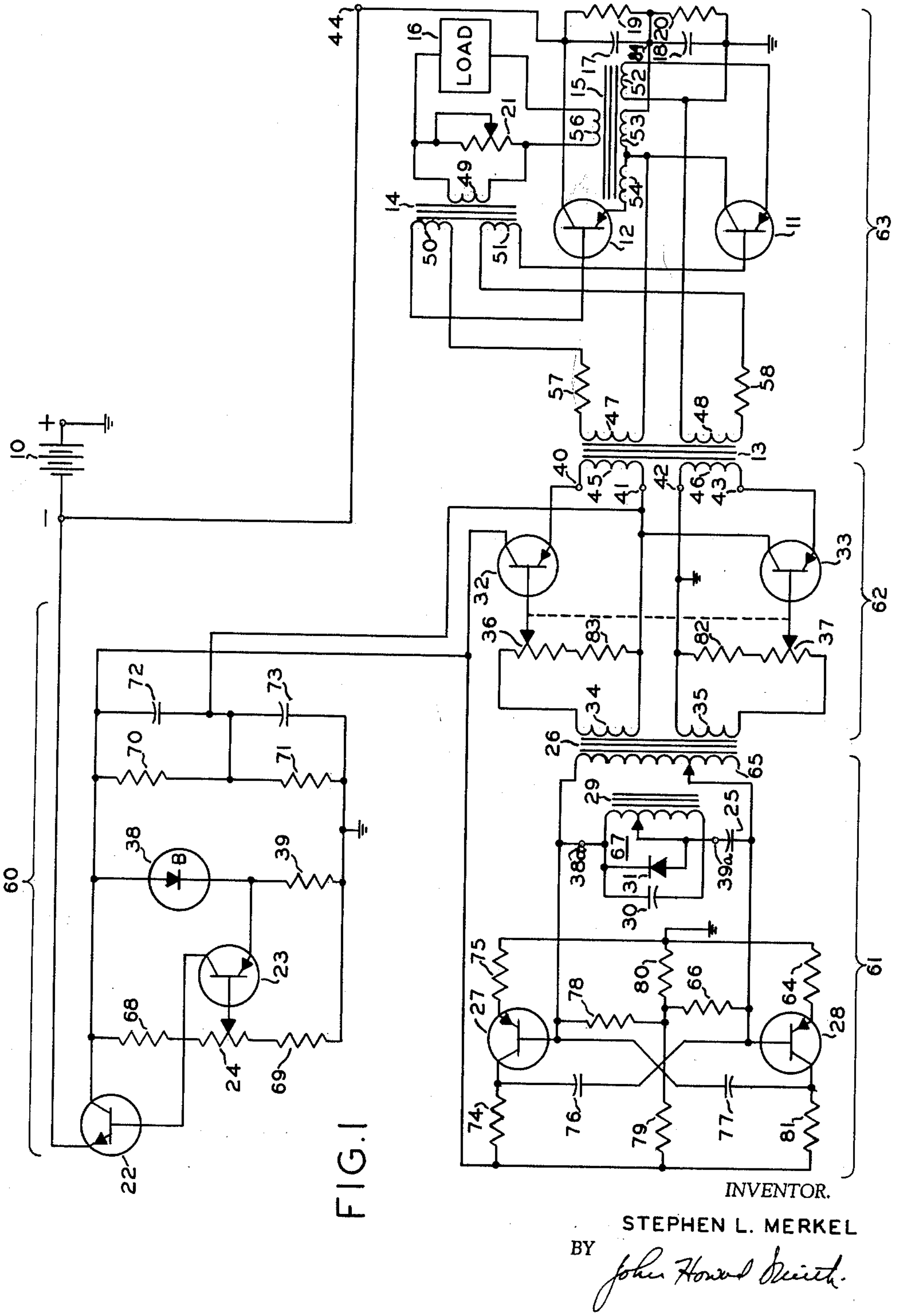

This application is a division of application Serial No. 730,962, filed April 25, 1958, now U.S. Patent No. 3,065,429, granted November 20, 1962.

This invention deals with direct current to alternating current converters, and particularly with a transistorized converter suitable for use as a ringing current supply in a telephone central office. The alternating current used for operating the ringers in telephone subscribers' sets has in the past been supplied from one of several different types of apparatus, including rotary generators, driven by either an alternating current or direct current motor, alternating current operated frequency converters, and vibratory pole changers. Ideally, the telephone ringing current generator must be reliable, and capable of operating continuously over a period of many years without failure and with a minimum of attention. The load which the source of ringing current must supply varies widely, and under abnormal operating conditions may greatly exceed the rated capacity of the source of ringing current. Therefore, the ringing current supply must be capable of operation under heavy overloads without damage to the equipment, and must resume normal operation as soon as the overload condition is removed.

In many telephone systems, selective signalling is achieved with mechanical resonant ringers operated selectively from a multi-frequency ringing current source. For this service, the frequency stability of the ringing current source is of the utmost importance, and the harmonic content of the ringing voltage is also important. In some multi-frequency systems, the ringing frequencies are in harmonic relationship to each other, so that a harmonic of a lower frequency can cause a false signal by operating a ringer of a higher frequency. A sinusoidal wave shape is, therefore, preferred for ringing voltage, as it eliminates the danger of cross-ring due to harmonics. At the same time, the presence of frequencies in the audio range of above, approximately 700 cycles is undesirable, because these frequencies when applied at the levels associated with ringing current can readily cross over into adjacent circuits and cause undesirable cross-talk.

Although the higher audio frequencies mentioned above are undesirable, the presence of an audible component in the ringing voltage is required in many telephone systems to signal the calling subscriber when the called subscriber's bell is rung. The ideal ringing current generator, therefore, includes an audio frequency component in the range around 500 cycles, and of a controllable magnitude.

Because telephone ringing current must be supplied even in the absence of the normal alternating current power, a direct current operated ringing current generator is preferred, but a direct current operated generator must have the highest possible efficiency, because any increase on the direct current consumption in the telephone office requires the installation of larger batteries, larger charging equipment, and results in increased alternating power consumption.

The telephone ringing current generators of the prior art have all fallen short of the ideal on one or more of the requirements outlined above. The direct current to alternating current converter of the present invention overcomes the major shortcomings of prior devices, and approaches the ideal characteristics as will be more fully explained in the following disclosure.

It is an object of my invention to provide a source of telephone ringing current operating from a direct current supply and employing transistors for converting the direct current to alternating current.

Another object of my invention is to provide a direct current to alternating current converter which has a relatively constant output voltage in spite of normal load current variation and in spite of variations in the direct current source voltage.

A further object of my invention is to provide a transistorized direct current to alternating current converter which will maintain relatively constant voltage for normal loads and which will not be subject to damage in case of overload or short circuit.

An additional object of my invention is to provide a transistorized direct current to alternating current converter having an output voltage approaching a sinusoidal wave shape.

A further object of my invention is to introduce into output voltage of my converter an audible tone signal of controllable frequency and amplitude.

A further object of my invention is to maintain a stable output frequency in a direct current to alternating current converter in spite of varying load, varying direct current source voltage, variations of ambient temperature, and prolonged continuous use.

An additional object of my invention is to supply an alternating current load from a direct current source with maximum efficiency, and to maintain high efficiency throughout a wide range of load variations.

A still further object of my invention is to provide means for adjusting the output voltage in a direct current to alternating current converter.

An additional object of my invention is to provide in a transistorized direct current to alternating current converter, a power amplifier which, when energized from a substantially constant voltage source, is characterized by substantially constant output voltage for normal load currents and greatly reduced output voltage for excessive load currents.

Figure 2:
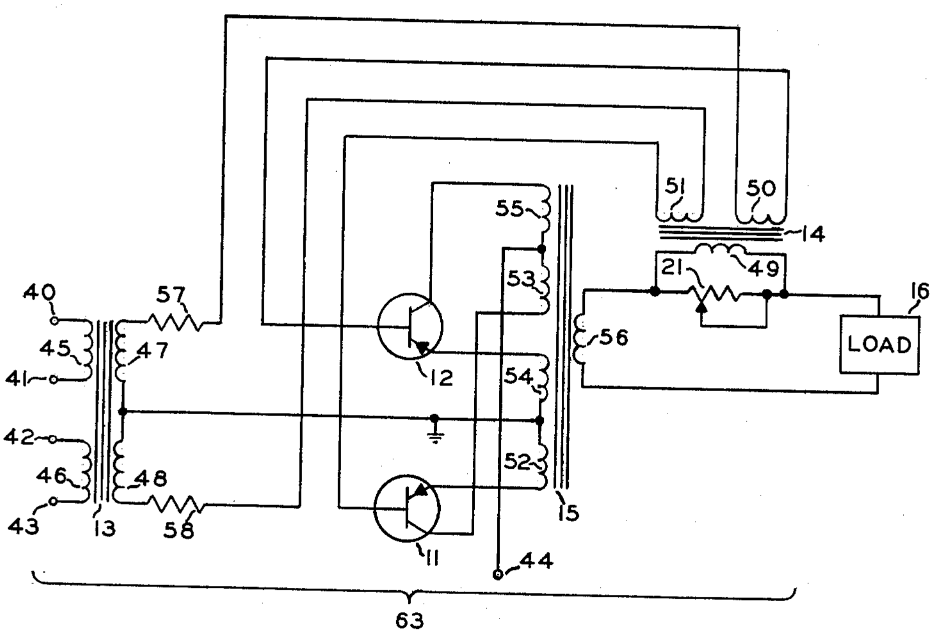

Other objects and a fuller understanding of my invention will be obtained from the following specification and claims taken in conjunction with the accompanying drawings in which:

FIGURE 1 is a schematic diagram of a preferred embodiment of my invention comprising a voltage regulator circuit supplying power to an oscillator and an intermediate amplifier, and comprising a power amplifier for supplying power to a variable load, and FIGURE 2 is the schematic diagram of a modified power amplifier which may be applied to the circuit of FIGURE 1.

With particular reference to FIGURE 1, there is shown a voltage regulator designated by the general reference character 60 supplying power to an oscillator circuit designated by the general reference character 61 and to an intermediate amplifier designated by the general reference character 62. The output of the oscillator 61 is fed through the amplifier 62 to a power amplifier designated by the general reference character 63 which supplies power to the load 16. A tone generating circuit designated by the general reference character 67 is a portion of the oscillator circuit 61. The tone generating circuit is provided with terminals **38*a* and 39*a* which are connected to the upper end of winding 65 and the upper side of capacitor 25**, respectively.

The voltage regulating circuit 60 makes use of a breakdown diode, or Zener diode 38 having a substantially constant voltage characteristic. The diode 38 is connected in series with resistor 39 across the voltage to be regulated. A voltage divider comprising resistors 68, 24 and 69 is also connected across the voltage to be regulated. A transistor 23 of PNP type is shown with its base connected to the slider of adjustable resistor 24 and its emitter connected to the junction between diode 38 and resistor 39. The substantially constant voltage across diode 38 is thus compared with a portion of the voltage to be regulated appearing across resistor 68 and a portion of resistor 24. In case the voltage across this portion of the voltage dividing circuit is less than the voltage across diode 38, the base of transistor 23 will be negative with respect to its emitter, and transistor 23 will conduct. The conduction of transistor 23 supplies current to the base of transistor 22, causing this transistor to conduct, and raising the voltage until the voltage at the base of transistor 23 approximates the voltage across the diode 38. The voltage regulating circuit described is of a type known in the art, and is shown only by way of example, as other devices known to those skilled in the art may be used for regulating the voltage to the oscillator and amplifier of my invention.

The regulated voltage is applied to two substantially equal resistors 70 and 71 to provide a mid-tap to the regulated voltage supply. Capacitor 73 is connected across resistor 71 and capacitor 72 is connected across resistor 70 to provide a path for alternating current impressed on the mid-tap of the direct current source.

The oscillator 61 shown in FIGURE 1 is of a multi-vibrator type, comprising transistors 27 and 28, having their collectors energized through resistors 74 and 81 respectively from the negative output of voltage regulator 60. The base of transistor 28 is coupled to the collector of transistor 27 through capacitor 76. The base of transistor 27 is coupled to the collector of transistor 28 through capacitor 77. A resonant circuit which establishes the frequency of oscillation is connected between the base of transistor 27 and the base of transistor 28. The resonant circuit comprises primary winding 65 of transformer 26 which acts as an inductance element, and capacitor 25, which is connected in parallel with winding 65. Resistors 75 and 64 in the emitter circuits of transistors 27 and 28, respectively, serve to limit the emitter currents of these transistors. Resistors 79 and 80 comprise a voltage divider, the intermediate point of which is connected through resistors 78 and 66, respectively, to the bases of transistors 27 and 28 to provide sufficient bias to insure starting of the oscillations. Resistors 78 and 66 provide the direct current potential to the bases of the transistors; these resistors must be of relatively high resistance because they are connected directly across the resonant circuit which sets the frequency of oscillation.

The action of a multi-vibrator circuit such as that shown is well known and need not be described in detail here. The frequency of oscillation is established by the resonant frequency of capacitor 25 with the linear inductance element comprising transformer winding 65. Winding 65 is provided with taps for adjusting the frequency of oscillation. Other methods known in the art for adjusting the inductance or capacitance in the circuit, such as a movable core in transformer 26 may also be employed in adjusting the frequency.

The tone generating circuit 67 is connected in series with capacitor 25 in the resonant circuit. In this position it might be considered a portion of the resonant circuit and, therefore, a major factor in determining the frequency of oscillation of the oscillator. However, one of the features of my invention is a tone generating circuit which does not interfere with the normal operation of the oscillator.

The tone generating circuit 67 comprises a saturable inductance 29 connected in parallel with capacitor 30. The winding of inductance 29 may be energized at an intermediate point as shown or through the entire winding. Taps may be provided for adjustment of the effective impedance of the tone generating circuit. The half-wave rectifier 31 bypasses the tone generating circuit for one-half cycle of the current through capacitor 25. By the introduction of the rectifier 31, I am able to maintain normal operation of the oscillator in spite of the presence of the tone generating circuit.

During the half-cycle of alternating current through capacitor 25 in which rectifier 31 conducts, the tone circuit is effectively shorted out. During the opposite half-cycle, the current of capacitor 25 is forced to flow through the winding of saturable inductance 29. The inductance is thereby saturated, and a momentary voltage surge occurs during one portion of the cycle. This voltage surge is impressed directly on the winding 65 of transformer 26 and is thus transmitted to the intermediate amplifier. The magnitude of the voltage surge can be controlled by choice of the taps on the tapped winding of saturable inductance 29. This voltage surge represents an audio frequency signal of controllable strength which is thus introduced into the output of the oscillator.

I prefer to connect a capacitor, such as the capacitor 30, in parallel with the saturable inductance element. Capacitor 30 together with inductance 29 produces a damped oscillation in the tone generating circuit and controls the frequency range of the audible signal which is introduced into the output voltage of the oscillator.

With the tone circuit 67 as shown, I am able to introduce an audio frequency component of controllable frequency and amplitude into the low frequency output voltage of oscillator 61 while maintaining the basic sinusoidal wave shape of this oscillator and without substantially affecting the frequency of oscillation.

Since the oscillator is supplied with regulated voltage from regulator 60, the amplitude of the signal produced across transformer 26 is substantially constant under all normal operating conditions.

An intermediate or driver amplifier 62 is connected between the oscillator 61 and the power amplifier 63 in the preferred embodiment of my invention shown in FIGURE 1. The intermediate amplifier serves as a buffer between the power amplifier and the oscillator to prevent changes of load on the power amplifier from noticeably affecting the frequency of oscillation. With sufficient gain in the power amplifier, and with adequate power in the oscillator circuit, the intermediate amplifier may be omitted.

The intermediate amplifier 62 shown in FIGURE 1 comprises transistors 32 and 33 having their base-collector circuits energized from the secondary windings 34 and 35 of transformer 26. The circuit shown is of the common collector type designed for current amplification to work into the low impedance injut circuit of the power amplifier. The energizing circuit of the intermediate amplifier includes voltage dividers comprising resistors 83 and 36 connected across winding 34 and resistors 82 and 37 connected across winding 35. Resistors 36 and 37 are potentiometers having their sliders connected to the bases of transistors 32 and 33 respectively. These two potentiometers are preferably ganged to provide a convenient adjustment of the output voltage of the converter and, being ganged, in the usual manner are movable in unison toward or away from one another as viewed in FIGURE 1. The transistors 32 and 33 are operated from the reduced voltage obtained from the mid-tap of voltage regulator 60. The emitter-collector circuit of transistor 32 is thus energized substantially in parallel with capacitor 72 and the emitter-collector circuit of transistor 33 is energized substantially in parallel with capacitor 73. Coupling transformer 13 has its primary winding 45 enerized from the emitter-collector circuit of transistor 32, and its primary winding 46 energized from the emitter-collector circuit of transistor 33.

The power amplifier 63 in FIGURE 1 comprises transistors 11 and 12 which are energized with substantially constant signal voltage from transformer 13. Because a transistor is inherently a constant current device, delivering an output current dependent upon the driving current, the provision of a substantially constant voltage drive does not directly provide a constant voltage output. In the practice of my invention, I employ inverse voltage feedback and positive current feedback in the power amplifier to obtain the desired results. The effect of inverse voltage feedback is to stabilize the output voltage and to hold it substantially constant even though the voltage of the direct current source 10 may fluctuate over a considerable range. However, as the load 16 changes, the emitter-base current of the transistors also changes, requiring more driving current to provide increased load current. In addition, the resistances in the circuit elements, including the base resistances of the transistors, tend to cause a reduction in the output voltage as the load current increases. I am able to counteract this reduction in voltage by the use of positive current feedback in the power amplifier, so that I can maintain a relatively constant load voltage for all normal values of load current.

The emitter-base circuit of transistor 12 is energized from winding 47 of transformer 13 through resistor 57, winding 50 of transformer 14 and winding 54 of transformer 15. Similarly, the emitter-base circuit of transistor 11 is energized from winding 48 of transformer 13 through resistor 58, winding 51 of transformer 14 and winding 52 of transformer 15. Resistors 57 and 58 are connected in series with the driving circuits to limit the base currents of transistors 11 and 12. These resistors may be omitted by designing the transformers with suitable internal resistance in their windings.

Primary winding 53 of output transformer 15 is energized from the emitter-collector circuits of both transistors by means of a center tapping arrangement applied to the direct current source 10. The center tapping arrangement comprises resistors 19 and 20 with capacitors 17 and 18, respectively, providing alternating current paths to the center tap 84. Transistors 11 and 12 operate as a class B push-pull amplifier, in which each transistor conducts current during approximately one-half of the driving voltage cycle. While transistor 12 is conducting, a current path is provided through winding 53 from right to left, energized substantially in parallel with capacitor 17. While transistor 11 is conducting a current path is provided from left to right through winding 53, energized substantially in parallel with capacitor 18. The circuit is designed so that the maximum voltage each transistor must control is only slightly above the voltage of source 10. This enables the use of currently available transistors in a highly efficient circuit operating directly from the 50 volt battery normally available in telephone central offices.

Load current is supplied from secondary winding 56 of output transformer 15. The resistor 21 is connected between the load 16 and the output winding 56, to act as an impedance element in the current feedback circuit. The voltage developed across resistor 21 is applied to winding 49 of transformer 14. Windings 50 and 51 of transformer 14 are connected respectively in the emitter-base circuits of transistors 12 and 11. In these circuits, they supply voltage in addition to the substantially constant drive voltage obtained from transformer 13. The inverse voltage feedback is obtained directly from transformer 15 with windings 52 and 54, which are respectively connected in the emitter-base circuits of transistors 11 and 12. The voltage developed by these windings is in opposition to the voltage provided by transformer 13.

By adjustment of resistor 21, the current feedback can be set to a value which will provide relatively constant voltage for normal load currents. In case of an overload, it is necessary to limit the maximum current which can be drawn from the circuit, to protect the circuit elements, particularly transistors 11 and 12. In one embodiment of my invention I accomplished this result by causing the core of transformer 14 to saturate at a predetermined value of load current. For load currents in excess of this value, the current feedback ratio is substantially reduced, thereby limiting the maximum load current which can be drawn from the power amplifier.

However, my power amplifying circuit has a current limiting characteristic which is not dependent upon the saturation of transformer 14. With increasing values of load current, the current gain of transistors 11 and 12 has a tendency to fall off rather rapidly. Consequently, the output voltage across load 16 falls off at higher values of load current due to the loss of gain in the transistors. This characteristic is amplified by the fact that the output current falls in proportion to the load voltage, so that the impedance of load 16 can be reduced to very low values or even to a short circuit without damaging the transistors 11 and 12. By proportioning the circuit elements so that a relatively large portion of the total driving power is obtained from the current feedback circuit, I am able to produce a sharply drooping output voltage characteristic which provides excellent protection for the transistors 11 and 12 under overload conditions. At the same time, by deriving a large portion of the driving power from the load circuit instead of from the driver amplifier, the power requirements placed on this amplifier become relatively light and readily attained with small components, which in turn reflect very little power drain on the oscillator 61.

The voltage drops through the circuit resistances in the driving circuit of the power amplifier and in the load circuit of the power amplifier are also determining factors in establishing the amount of current feedback which is required. These circuits are, therefore, preferably designed with sufficiently high resistance to provide the current feedback ratio which corresponds with the required voltage regulation characteristic.

By adjustment of resistor 21, the current feedback ratio can be adjusted to obtain the required regulation between no load and rated full load on the power amplifier, and can also be adjusted to compensate for manufacturing variations in the gain of power transistors 11 and 12.

FIGURE 2 is the schematic diagram of a modified power amplifier embodying features of my invention. The circuit of FIGURE 2 can be substituted for a portion of the circuit of FIGURE 1 terminated at terminals 40, 41, 42, 43, and 44. The circuit of FIGURE 2 also comprises a push-pull class B amplifier circuit employing transistors 11 and 12 and embodying the inverse voltage feedback and positive current feedback circuits of FIGURE 1. The direct current power supply circuit in FIGURE 2 differs from that in FIGURE 1 in employing two windings 53 and 55 for energizing the output transformer 15 in place of the single winding 53 shown in FIGURE 1. The emitter-collector circuit of transistor 12 is energized from the source 10 having terminal 44, through winding 55. The emitter-collector circuit of transistor 11 is energized from terminal 44 through winding 53. The emitter-base circuit of transistor 11 is energized from winding 48 through resistor 58, winding 51 and winding 52 as in FIGURE 1. The emitter-base circuit of transistor 12 is energized from winding 47 through resistor 57, winding 50, and winding 54 as in FIGURE 1. The operation of the circuit of FIGURE 2 is substantially the same as that of FIGURE 1, except that the maximum voltage which transistors 11 and 12 must sustain in FIGURE 2 is equal to slightly more than twice the voltage of source 10. This circuit is, therefore, adapted for use with higher voltage transistors, or for operation from a direct current source of reduced voltage.

Although the circuits shown employ class B push-pull amplifiers and type PNP transistors in both the driver and power stages, it will be apparent to those skilled in the art that the features of my invention may be embodied in other known types of amplifier circuits, such as single ended Class A circuits or with type NPN transistors without departing from the scope of my invention.

It is understood that this disclosure has been made only by way of example, and that numerous modifications in the choice and arrangement of parts may be resorted to without departing from the spirit and scope of the invention as hereinafter claimed.

I claim:

1. In an oscillating circuit energized from a source of time varying voltage, the combination of linear inductance means and capacitance means for determining the frequency of oscillation of said circuit, with wave distorting means for introducing high order harmonics into said circuit, said wave distorting means comprising a saturable inductance element connected in series with said capacitance means and a half-wave rectifier connected substantially in parallel with said saturable inductance element, whereby the effect of said saturable inductance element on the frequency of oscillation of said circuit is minimized by said half-wave rectifier.

2. In an oscillating circuit energized from a source of time varying voltage, the combination of linear inductance means and first capacitance means for determining the frequency of oscillation of said circuit, with wave distorting means for introducing high order harmonics into said circuit, said wave distorting means comprising a saturable inductance element connected in series with said first capacitance means, a half-wave rectifier, and second capacitance means, said half-wave rectifier being connected substantially in parallel with said saturable inductance element, whereby the effect of said saturable inductance element on the frequency of oscillation of said circuit is minimized by said half-wave rectifier, said second capacitance means being connected in parallel with said saturable inductance element and comprising with it an oscillating circuit for said high order harmonics.

3. An oscillator comprising in combination first and second transistors, each having a base, an emitter, and a collector, first and second resistors, first, second, and third capacitors, first and second direct current circuits, means for energizing said first and second direct current circuits in parallel from a source of direct current, said first circuit comprising said first resistor, the collector of said first transistor and the emitter of said first transistor, said second direct current circuit comprising said second resistor, the collector of said second transistor and the emitter of said second transistor, said first capacitor being connected between the collector of said first transistor and the base of said second transistor, said second capacitor being connected between the collector of aid second transistor and the base of said first transistor, a linear inductance element, a saturable inductance element, a half-wave rectifier, said linear inductance element being connected between the base of said first transistor and the base of said second transistor, said third capacitor being connected substantially in parallel with said linear inductance element and comprising with it a resonant circuit to determine the frequency of oscillation of said oscillator, said saturable element being connected in series with said third capacitor and comprising a wave distorting element, said half-wave rectifier being connected substantially in parallel with said saturable inductance element to by-pass current from said third capacitor around said saturable inductance element during alternate half cycles, to insure freedom of oscillation of said resonant circuit, said saturable inductance element being saturated when said half-wave rectifier is non-conductive, to introduce high order harmonics in the output voltage of said oscillator.

4. An oscillator comprising in combination first and second transistors each having a collector, base, and emitter, first and second resistors, first, second, third, and fourth capacitors, a linear inductance element, a saturable inductance element, a half-wave rectifier, first and second direct current circuits, means for energizing said first and second direct current circuits substantially in parallel from a source of direct current, said first direct current circuit comprising said first resistor, the collector of said first transistor, and the emitter of said first transistor, said second direct current circuit comprising said second resistor, the collector of said second transistor, and the emitter of said second transistor, said first capacitor being connected between the collector of said first transistor and the base of said second transistor, said second capacitor being connected between the collector of said second transistor and the base of said first transistor, said linear inductance element being connected between the base of said first transistor and the base of said second transistor, said third capacitor being connected substantially in parallel with said linear inductance element and comprising with it a resonant circuit to determine the frequency of oscillation of said oscillator, said saturable inductance element being connected in series with said third capacitor, said fourth capacitor being connected substantially in parallel with said saturable inductance element, said half-wave rectifier being connected substantially in parallel with said saturable inductance element, said half-wave rectifier by-passing alternate half cycles of current from said third capacitor around said saturable inductance element to insure freedom of oscillation of said resonant circuit, said saturable inductance being saturated on non-conducting half-cycles of said half-wave rectifier and producing with said fourth capacitor a damped oscillation at a frequency which is a high order harmonic of the freqency of said oscillator.

References Cited in the file of this patent

UNITED STATES PATENTS 2,896,090 Feder ---------------- July 21, 1959